June 23, 1931.  H. E. ALTGELT  1,811,072
TRACTOR
Filed March 19, 1923   2 Sheets-Sheet 1
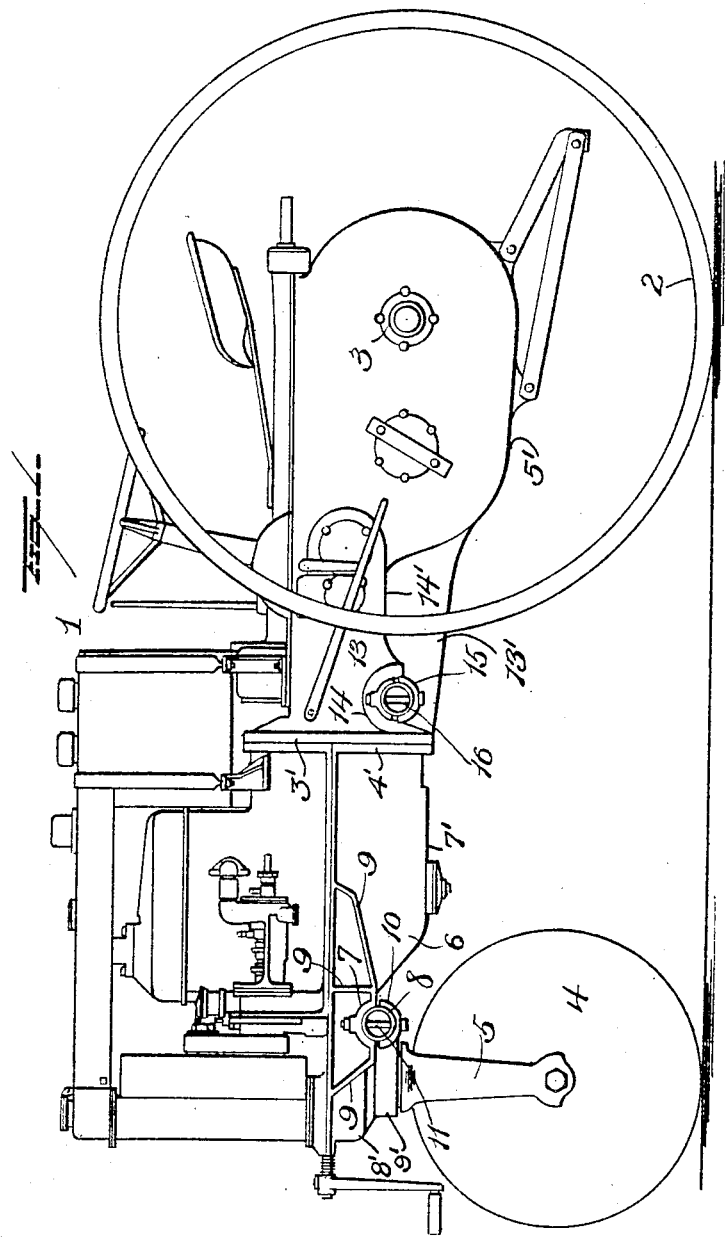
Inventor
H. E. Altgelt
By Seymour Bright
Attorneys

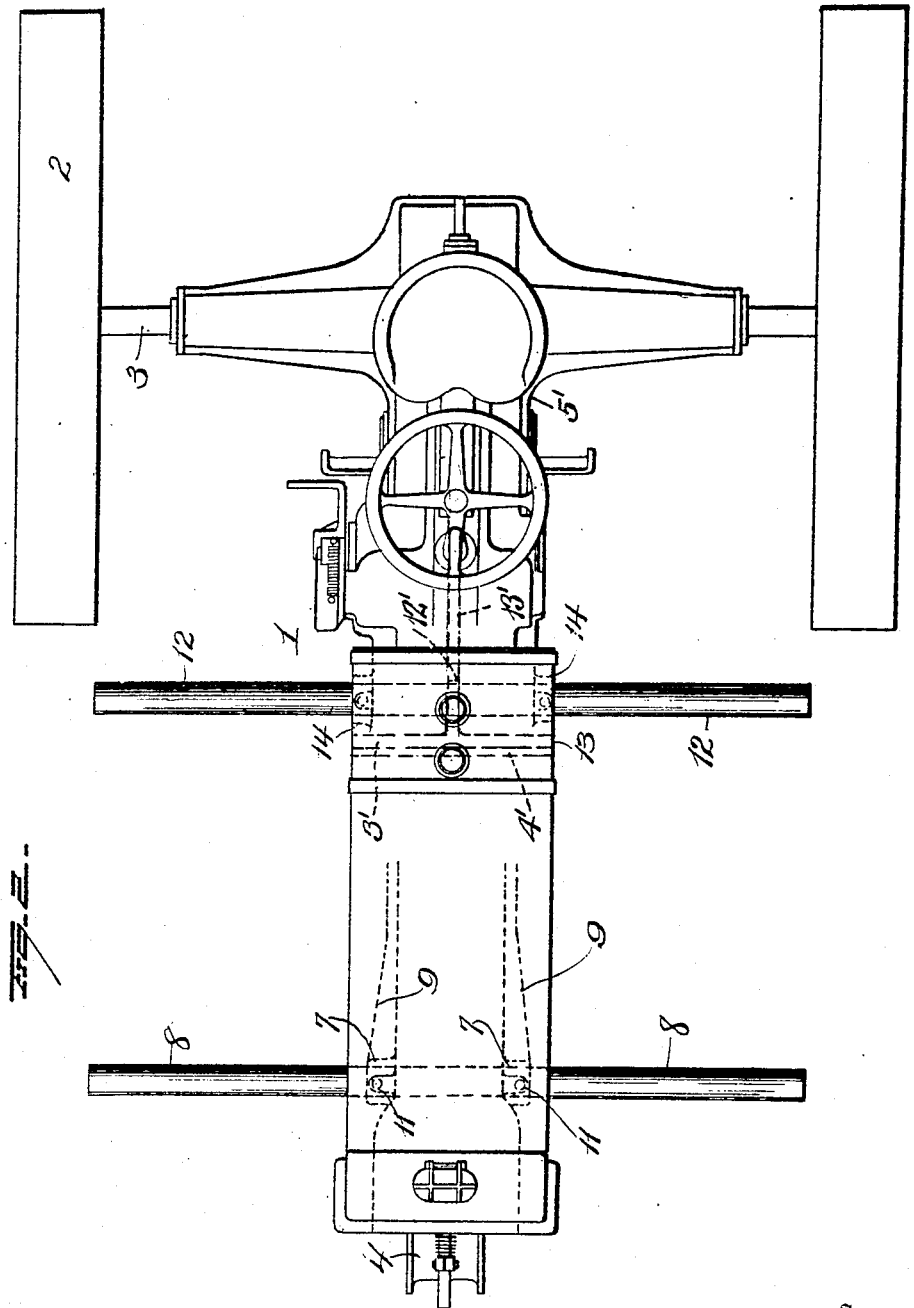

// Patented June 23, 1931

1,811,072

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

TRACTOR

Application filed March 19, 1928. Serial No. 262,930.

This invention relates to improvements in tractors and more particularly to means to facilitate connection therewith of agricultural appliances,—one object of the invention being to provide a tractor with simple and efficient anchoring or supporting and connecting means for agricultural implements and operating and controlling means therefor, and to so locate and secure such means to the tractor that the same may be easily fixed to the tractor and project in opposite directions laterally therefrom in a manner to support and constitute attaching means for implements of various kinds.

With this and other objects in view, the invention consists in certain novel features of construction and combinations of parts as hereinafter set forth and pointed out in the claims.

In the accompanying drawings:—

Figure 1 is a view in side elevation of a tractor, showing an application of my improvements, and Figure 2 is a plan view.

In illustrating one form of my invention, I have shown the same in connection with a conventional form of tractor generally indicated by the reference character 1 in which the frame is preferably made of two sections, namely a rear transmission mechanism and axle housing section indicated generally by the reference character 5′ and a forward section which constitutes the crank case pan and bearing for the front steering bracket. This section is indicated generally by the reference character 7′. The adjacent ends of these sections, namely 5′ and 7′ are provided with laterally projecting flanges 3′ and 4′ respectively, by means of which these sections are secured together to form a single longitudinally extending frame as clearly shown in Fig. 1 of the drawings. The forward frame section 7′ includes a crank case or a pan 6 which in turn is formed integrally with a forwardly projecting portion as shown at 8′ which forms the support for the radiator of the tractor. Formed integrally with and projecting downwardly from this forward portion 8′ of the forward frame section 7′ is an annular bearing barrel 9′ in which is journaled or swiveled the front wheel bracket 5 which in turn has journaled therein, the front steering wheel 4. Formed integrally with the front frame section 7′ and located on the opposite side thereof are two spaced apart bearing brackets generally indicated by the reference character 7 which in turn have semi-circular sockets for receiving and securing therein, a transverse implement supporting beam or bar 8. This beam 8 is secured in these bearing brackets 7 by means of clamping jaws 10 and bolts 11. The bearing brackets 7 are reinforced by longitudinally extending ribs 9 which are also formed integrally with the forward frame section 7′.

The rearward frame section 5′ is supported on traction wheels 2 through the medium of the axle sections 3 which extend into the rear frame housing. Formed integrally with the rear frame section 5′ is a transmission housing 13 which has its lower wall thereof as shown at 14′ slightly elevated above the bottom of the rear axle housing of the rear frame section 5′. Extending longitudinally of and in the center of the rear frame section 5′ is a rib 13′ which extends from the flange 3′ to the rear housing portion. Extending transversely through the longitudinal rib 13′ is an aperture 12′. Formed integrally with the transmission housing 13 and also the clutch housing are spaced apart bearing brackets 14 which are located on the opposite sides of the rear frame section 5′ and are provided with semi-circular sockets located in transverse alignment with the aperture 12′ in the rib 13′ for receiving therein a second transverse implement supporting beam or bar 12. This beam or bar 12 is secured in these brackets by means of clamping jaws 15 and bolts 16.

It will be noted that the transverse bar or beam 8 is located adjacent to and rearwardly of the vertical axis of the swivel bracket 5 and also rearwardly of the axis of the front steering wheel 4 and is secured to the front frame section below the front portion of the crank case or oil pan 6. These transverse bars or supporting implement beams are preferably tubular in form and have their outer ends terminating approximately in line with the rear traction wheels 2, but to adapt them to receive certain types of agricultural implements, these beams or bars may be shortened or may be lengthened to a point beyond the line passing longitudinally through the tread of the traction wheels for the purpose of accommodating different types of agricultural attachments. It will be further noted that the transverse beam 12 extends under the lower wall of the transmission and clutch housing and is secured to the rear frame section through the medium of the spaced apart brackets formed integrally with this section.

The lower portion of the crank case or oil pan 6 of the tractor, is provided near its forward end with bearings 7 for a transverse bar or beam 8. It will be observed that this transverse implement supporting beam 8, is located adjacent to and rearwardly of the vertical axis of the swivel bracket 5 and also rearwardly of the axis of the front steering wheel 4. In the present instance the bearings 7 are reinforced by ribs 9 and these ribs and bearings form, in effect, brackets which receive the intermediate portions of the bar or beam 8,—the latter being securely fixed to the bearing brackets on the crank case or oil pan by means of clamping jaws 10 secured by bolts 11 passing through said jaws, the bar or beam and the bearing brackets.

The transverse bar or beam 8 is shown in the form of a tube which passes under the crank case or oil pan 6 and projects laterally from the same in both directions.

Another transverse bar or beam 12 (which is also preferably tubular in form) is secured to an intermediate portion of the tractor frame and extends through an aperture 13' in the frame structure, at a point under the transmission and clutch housings 13 of the tractor and projects through an aperture 12' formed in a longitudinally extending housing rib 13'. This beam extends laterally in both directions from the tractor. The transmission and clutch housings 13 are provided with bearing brackets 14 to receive the rear transverse bar or beam 12 and the latter is secured to said bearing brackets by means of jaws 15 secured by bolts 16 which pass through said jaws, the bar or beam 12 and the bearing brackets 14.

In the drawings, I have shown the transverse bars or beams 8 and 12 as terminating approximately in line with the rear traction wheels 2, but to adapt them to receive certain types of agricultural implements, said bars or beams may be made shorter and for the accommodation of other agricultural implements, said bars or beams may be made of such length as to project outwardly beyond alignment with the traction wheels, or if found expedient in any instance, one of said bars or beams might be made longer than the other.

The transverse bars or beams 8 and 12 constitute anchoring or attaching means to the tractor of a variety of implements such, for example, as cultivators, planters, grass mowers, hay rakes, sprayers, scrapers or in fact any attachment which it might be desired to apply to a tractor or use in connection therewith.

Having fully described my invention, what I claim as new and desire to secure by Letters-Patent, is:—

1. The combination with a tractor having a crank case, bearing brackets formed integrally with said crank case, of a transverse beam seated in and secured rigidly to the bearing brackets on the crank case, said beam passing under said crank case and projecting laterally beyond respective sides of the tractor.

2. The combination with a tractor having a transmission housing, a longitudinally extending rib formed integrally with and on the bottom of said housing, said rib having a transversely extending aperture therein, brackets formed integrally with said housing in alignment with the aperture in said rib and a transversely projecting beam extending through said aperture and secured to said brackets.

3. The combination with a tractor having a transmission housing, there being an aperture in said housing structure extending transversely therethrough, spaced apart brackets formed integrally and in alignment with the aperture in said housing structure, and a transversely projecting beam extending through said aperture and secured to said bracket.

4. The combination with a tractor having a crank case and a transmission housing, of attachment supporting beams secured rigidly and directly to said crank case and extending through a portion of the tractor frame adjacent said transmission housing, and projecting laterally from the same.

5. The combination with a tractor having a crank case and a transmission housing, of attachment supporting beams rigidly secured to and extending under said crank case and transmission housings respectively, one of said beams extending through a portion formed integrally with the transmission housing and projecting laterally from the same, said beams passing under said crank case and transmission housings, and projecting beyond both sides of the tractor.

6. The combination with a tractor of a forward transverse beam secured beneath and projecting laterally beyond the respective sides of the tractor adjacent the front end thereof, and a second transverse beam spaced rearwardly from the first mentioned beam secured to and extending through a portion of the tractor frame adjacent said transmission housing structure.

7. The combination with a tractor having a front steering means, of a transverse beam passing under the forward portion of the crank case of the tractor and secured directly thereto at a point rearwardly of the axis of the front steering means, said transverse beam constituting mounting means for an attachment to the tractor.

8. The combination with a tractor having a crank case, of brackets formed integrally with the crank case and having sockets formed therein, a transverse beam passing under the forward portion of said crank case and secured in said sockets, said beam projecting beyond the respective sides of the tractor.

9. The combination with a tractor of a frame therefor, a crank case forming a part of the frame, a transmission housing forming a part of the frame, spaced apart brackets formed as a part of said crank case and transmission housings, there being sockets formed in said brackets, and transversely extending beams secured in said sockets and projecting laterally beyond the respective sides of the tractor, said beams constituting attachment supporting means.

10. The combination with a tractor having a longitudinally extending frame, there being an aperture in said frame extending transversely therethrough, and a transversely projecting beam secured rigidly to said frame and extending through said aperture.

11. The combination with a tractor having a longitudinally extending frame, there being an aperture in said frame extending transversely therethrough, spaced apart brackets formed integrally with said frame and in alignment with said aperture, and a transversely projecting beam extending through said aperture and secured to said brackets.

12. The combination with a tractor having a longitudinally extending frame, there being a transversely extending aperture in said frame, located at a point intermediate the ends of said frame, brackets formed integrally with said frame and in alignment with said aperture and a transversely projecting beam extending through said aperture and rigidly secured to said brackets.

In testimony whereof, I have signed this specification.

HERMAN E. ALTGELT.